US012413015B2

(12) United States Patent
Steube et al.

(10) Patent No.: US 12,413,015 B2
(45) Date of Patent: Sep. 9, 2025

(54) PLUG CONNECTION, PLUG CONNECTOR, LATCHING MEANS, AND METHOD FOR FORMING THE LATCHING MEANS

(71) Applicants: Weidmüller Interface GmbH & Co. KG, Detmold (DE); PHOENIX CONTACT GmbH & Co. KG, Blomberg (DE)

(72) Inventors: Benedikt Steube, Lohne (DE); Stefan Aporius, Detmold (DE); Lars Brinkmann, Detmold (DE); Roman Henze, Horn-Bad Meinberg (DE); Robin Reinke, Detmold (DE); Willi Lang, Detmold (DE); Karsten Krome, Detmold (DE)

(73) Assignee: Weidmüller Interface GmbH & Co. KG and PH (DE)

( * ) Notice: Subject to any disclaimer, the term of this patent is extended or adjusted under 35 U.S.C. 154(b) by 408 days.

(21) Appl. No.: 17/906,595

(22) PCT Filed: Mar. 4, 2021

(86) PCT No.: PCT/EP2021/055520
§ 371 (c)(1),
(2) Date: Sep. 16, 2022

(87) PCT Pub. No.: WO2021/190899
PCT Pub. Date: Sep. 30, 2021

(65) Prior Publication Data

US 2023/0144954 A1 May 11, 2023

(30) Foreign Application Priority Data

Mar. 25, 2020 (DE) ........................ 102020108288.6

(51) Int. Cl.
*H01R 13/627* (2006.01)
*H01R 12/57* (2011.01)
(Continued)

(52) U.S. Cl.
CPC ......... *H01R 13/6272* (2013.01); *H01R 12/57* (2013.01); *H01R 13/633* (2013.01); *H01R 13/6582* (2013.01)

(58) Field of Classification Search
CPC .. H01R 13/6272; H01R 13/633; H01R 12/57; H01R 13/6582
(Continued)

(56) References Cited

U.S. PATENT DOCUMENTS 7,281,937 B2 * 10/2007 Reed .................. H01R 13/6275 439/352
7,354,292 B1 * 4/2008 Lloyd ................ H01R 13/6335 439/352

(Continued)

*Primary Examiner* — Gary F Paumen
(74) *Attorney, Agent, or Firm* — LAUBSCHER & Fretwell, P.C.

(57) ABSTRACT

An electrical and/or optical plug connection has a first plug connector and a second plug connector which can be fit to the first plug connector and which corresponds to the first plug connector. The first and second plug connectors each have a plug face which has a first sheet metal contact and a corresponding second sheet metal contact which can be fit together in an electrically contacting manner. The plug connectors further include first and second optical and/or electrical plug contacts which are fit together and which arranged with spacing from the first and second sheet metal contacts. A latching hook having a latching hook and latching arm is provided on the first plug connector and a corresponding latching recess having a latching edge is provided on the second plug connector. A hook portion (1 of the latching hook is connected to the latching arm via a (Continued)

bending line which deviates from a straight line and has a raised 3D shaped surface region with at least one open side.

12 Claims, 19 Drawing Sheets

(51) Int. Cl.
*H01R 13/633* (2006.01)
*H01R 13/6582* (2011.01)

(58) Field of Classification Search
USPC .......................................................... 439/352
See application file for complete search history.

(56) References Cited

U.S. PATENT DOCUMENTS

| | | | | |
|---|---|---|---|---|
| 7,666,023 | B2 * | 2/2010 | Wu | H01R 13/6275 439/352 |
| 7,699,641 | B2 * | 4/2010 | Bright | H01R 13/6275 439/352 |
| 9,590,355 | B2 * | 3/2017 | Kawamura | H01R 13/633 |
| 2014/0179145 | A1 | 6/2014 | Zhang | |
| 2016/0126672 | A1 | 5/2016 | Kawamura et al. | |
| 2019/0058288 | A1 | 2/2019 | Sakaizawa et al. | |

* cited by examiner

Fig. 3a
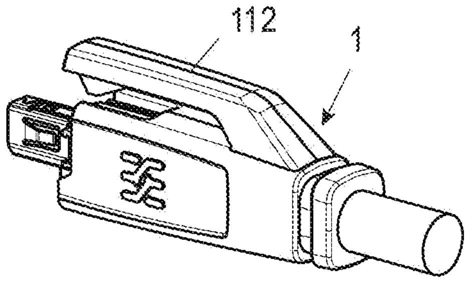
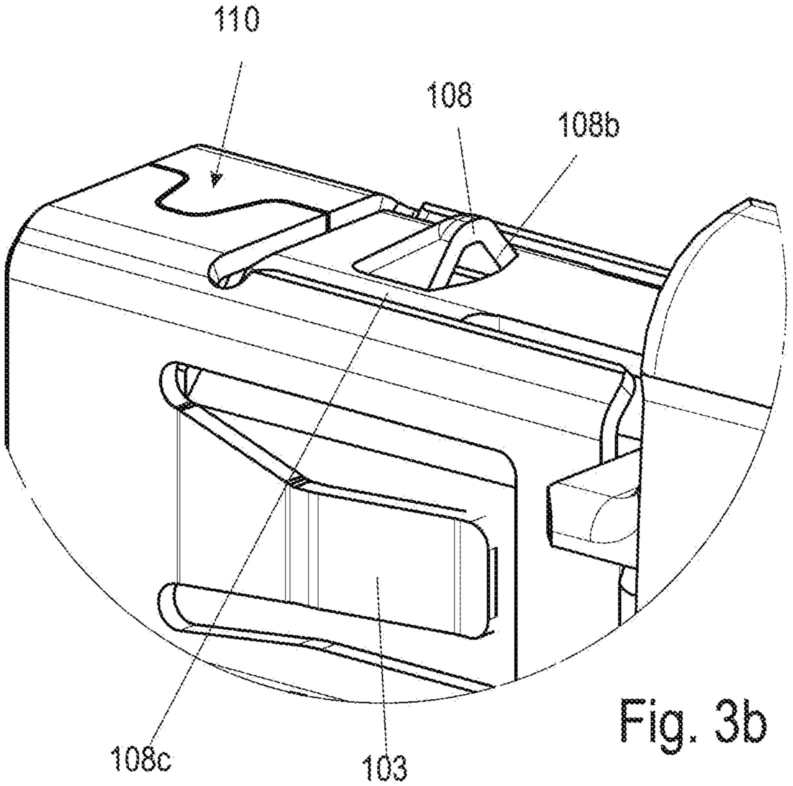
Fig. 3b
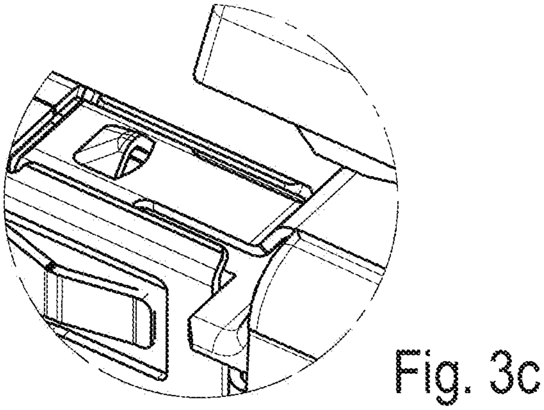
Fig. 3c

Fig. 4a
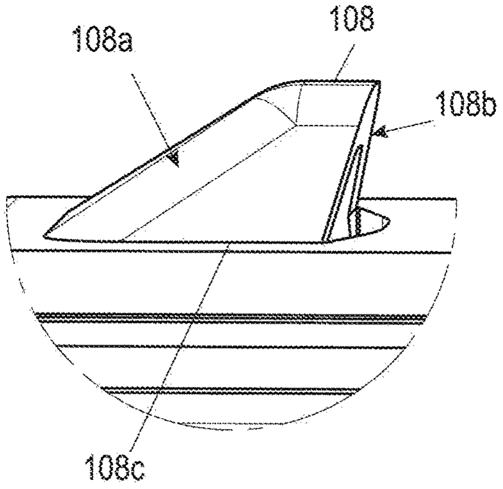
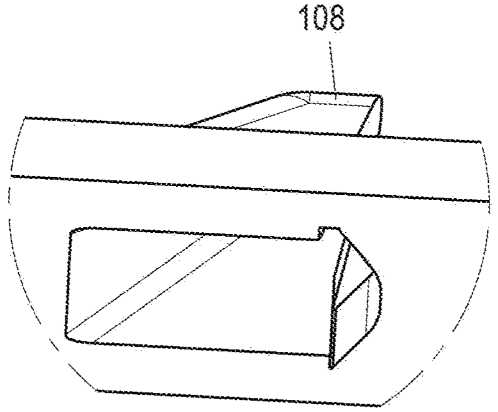
Fig. 4b
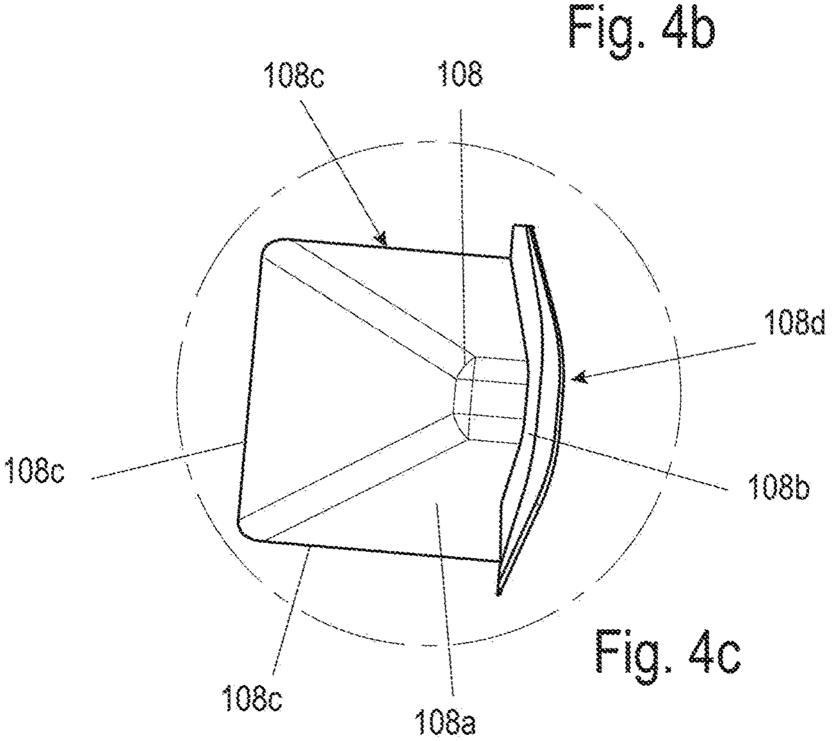
Fig. 4c

Fig. 5a
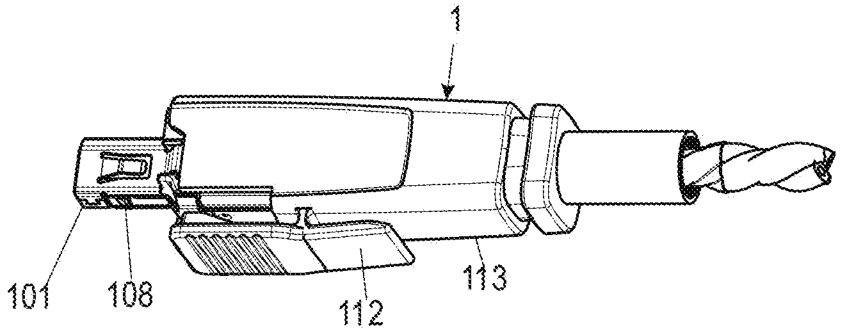
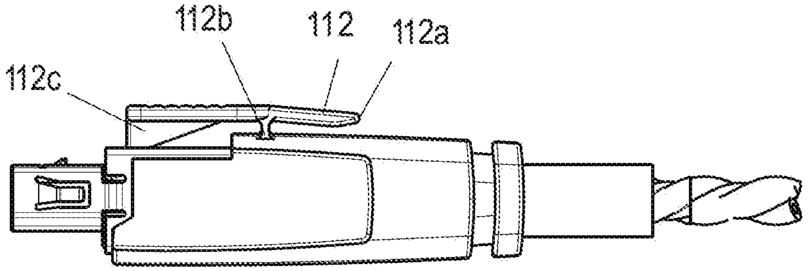
Fig. 5b
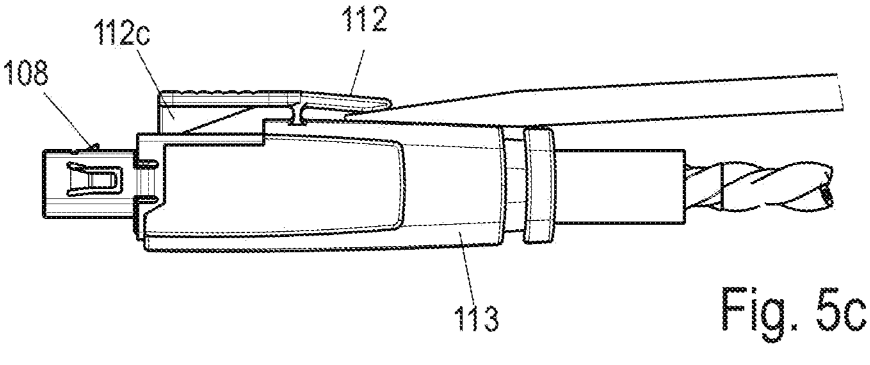
Fig. 5c
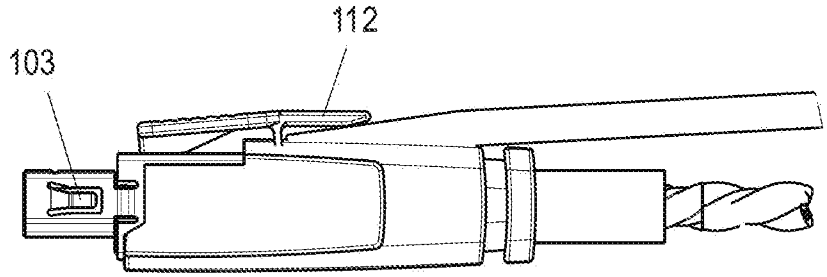
Fig. 5d

Fig. 5e
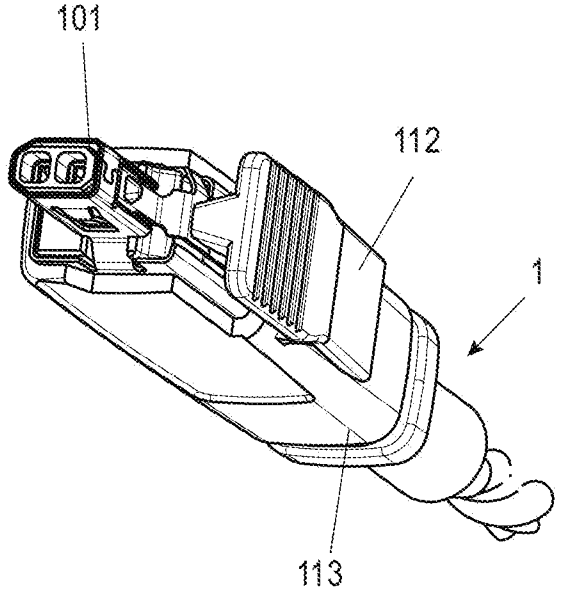
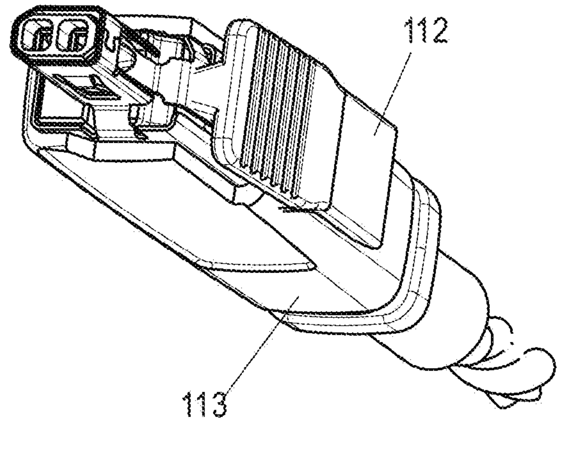
Fig. 5f 1
112
113
103
101

112
100
101
108

112
103

112
113

112
113

Fig. 10a
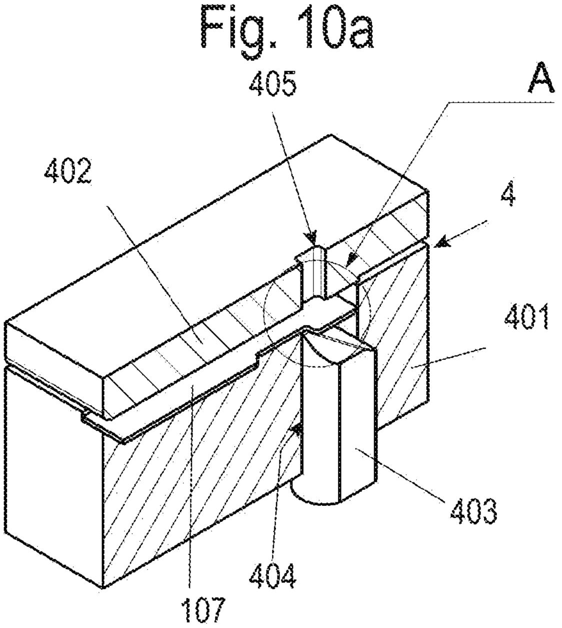
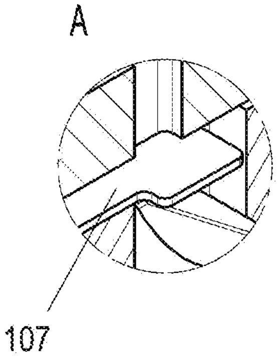
Fig. 10b
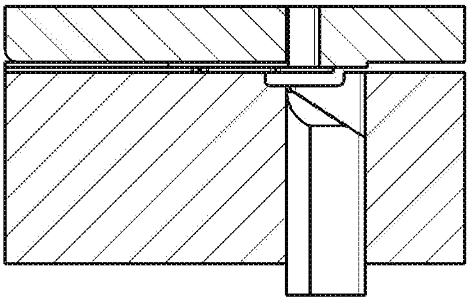
Fig. 10c

Fig. 11a
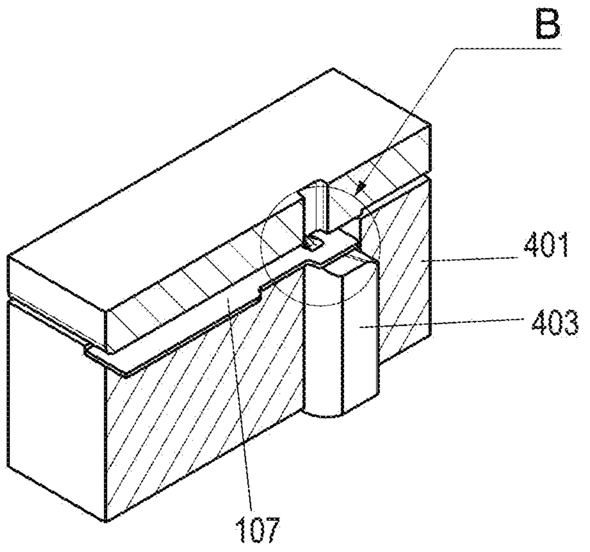
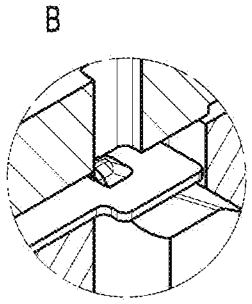
Fig. 11b
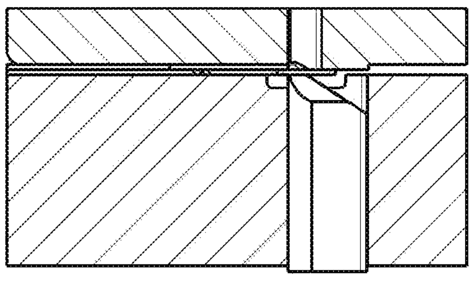
Fig. 11c

Fig. 12a
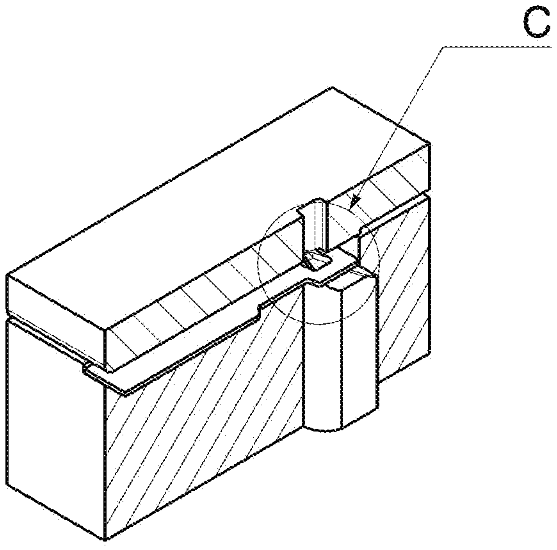
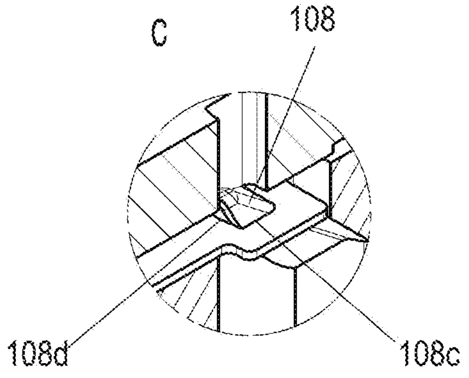
Fig. 12b
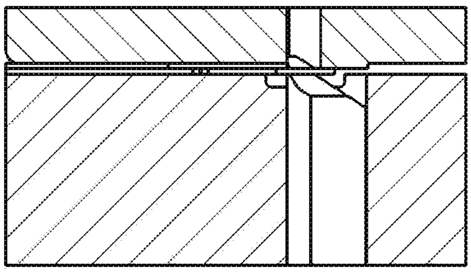
Fig. 12c

Fig. 13a
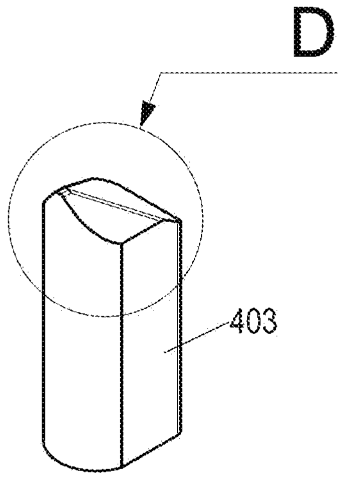
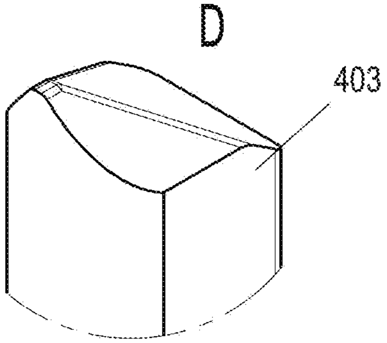
Fig. 13b
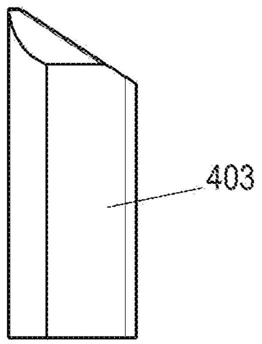
Fig. 13c

Fig. 16a
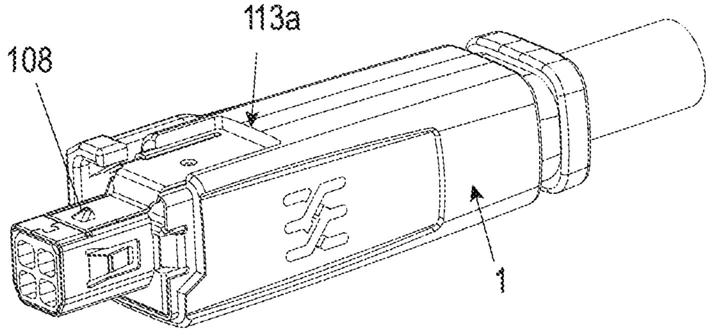
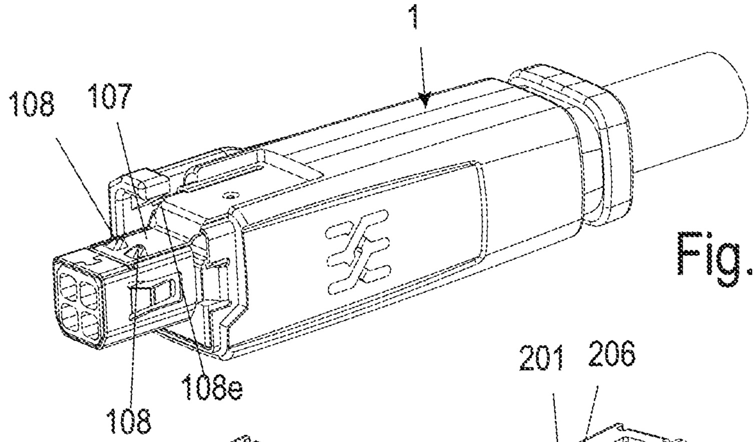
Fig. 16b
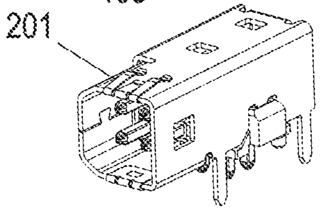
Fig. 16c
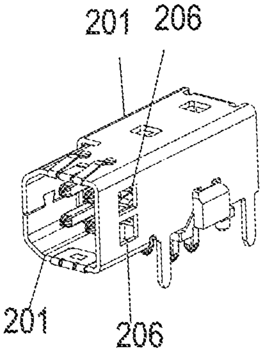
Fig. 16d
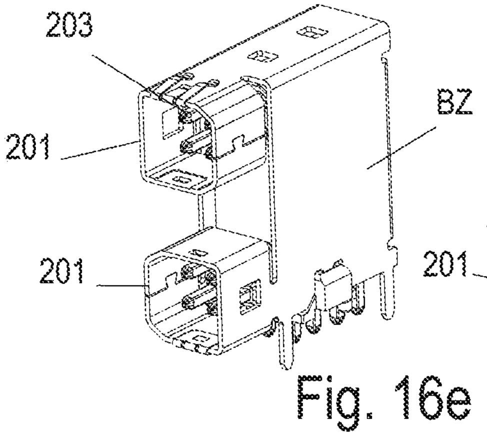
Fig. 16e
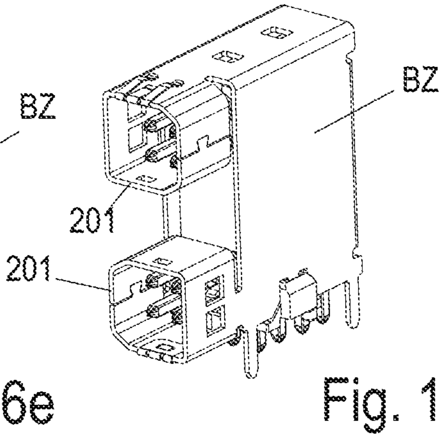
Fig. 16f

PLUG CONNECTION, PLUG CONNECTOR, LATCHING MEANS, AND METHOD FOR FORMING THE LATCHING MEANS

This application is a § 371 National Stage Entry of International Patent Application No. PCT/IB2021/055520 filed Mar. 4, 2021 which claims priority of Patent Application No. DE 10 2020 108 288.6 filed Mar. 25, 2020. The entire content of these applications is incorporated herein by reference.

BACKGROUND OF THE INVENTION

The invention relates to a plug connector, a latching device for the plug connector and a method for constructing the latching device on a metal sheet.

In order to latch together corresponding first and second plug connectors to connect optical and/or electrical plug contacts, it is necessary to construct a first latching device on the first plug connector and a second latching device, which corresponds to the first latching device, on the second plug connector. Generally, the first latching device of the first plug connector is a latching hook and the second latching device of the second plug connector is a latching recess or a latching opening having a latching edge, in which or behind which the latching hook can resiliently latch when the two plug connectors are pushed or fitted together.

SUMMARY OF THE INVENTION

An object of the invention is to develop a plug connection in such a manner that a latch connection can be configured to be very compact and relatively stable.

According to a preferred embodiment, there is provided an electrical and/or optical plug connection having a first plug connector and a second plug connector which can be fitted to the first plug connector and which corresponds to the first plug connector. The first and second plug connectors each have a plug face which has a first contact which is produced from a metal sheet as a sheet metal contact, and a corresponding second sheet metal contact which can be fit together therewith in an electrically contacting manner. First and second optical and/or electrical plug contacts are also provided which can be fit together and which are arranged with spacing from the respective sheet metal contacts. A latch connection is constructed between the first and second plug connectors in the assembled state and includes a first latching device on the first plug connector and a corresponding second latching device on the second plug connector. The first latching device is in the form of a latching hook and the second latching device is in the form of a corresponding latching recess, particularly having a latching edge, wherein the latching hook latches in the latching recess when the two plug connectors are fit together. The latching hook has a latching arm and a hook portion, and the hook portion is connected to the metal sheet which surrounds it, and particularly the latching arm, via a bending or score line which deviates from a straight line indifferent directions. The hook portion is preferably configured with a raised 3D shaped surface region which has at least one open side.

The plug connection with such a configuration is a very compact latching connection, the latching hook of which has a hook portion which can be configured in a very small manner and which nevertheless is highly durable.

The first sheet metal contact of the first plug connector and the corresponding second sheet metal contact of the second plug connector are configured to be fit together in a collar-like manner with the respective plug contacts arranged inside the respective collar-like region.

According to a preferred embodiment, the raised 3D shaped surface region of the hook portion forms a portion of a pyramid which has an open side. The pyramid has an inclined introduction member and an open side which can readily be anchored in the latching recess.

The open side of the hook member is constructed in an inclined manner at an angle not equal to 90° relative to the surrounding surface of the latching arm so that the open side at the edges thereof, which open side is formed by the edges of the raised 3D shaped surface region, is latched in a self-locking manner behind a latching edge of the latching recess. A 90° construction is also conceivable, but a construction with an acute angle less than 90° for self-locking is preferable.

The bending line has a u-shaped or v-shaped or semi-circular configuration.

According to a another embodiment of the invention, the latching arm is supported between the ends thereof so as to be pretensioned in the manner of an abutment on another element of the first plug connector. This is particularly advantageous in order to be able to release the latching connection by pressing on the latching arm.

To this end, for example, the plug contacts of the first plug connector are arranged in a contact carrier and the latching arm is supported in a pretensioned manner on the contact carrier between the ends thereof in an abutment-like manner. A free end of the pretensioned latching arm is supported internally on an edge region of the sheet metal contact, which has a gap, of the first plug connector with which edge region the latching arm partially overlaps.

According to an additional embodiment, the latching arm has a graduation and the contact carrier and the sheet metal contact also have a graduation.

According to a further embodiment, an actuation device is constructed on the first plug connector for releasing the latching connection.

In this case, the actuation device is configured as a lever-like actuation pressing member which is constructed to press down the latching hook by moving the hook portion out of the latching recess into a region inside the circumference of the sheet metal contact of the second plug connector so that the latching connection can readily be released and the plug connectors can be pulled apart.

The sheet metal contact of the first plug connector preferably has a substantially a polygonal cross-sectional shape and the latching hook is located at one of the sides of this polygon and the actuation pressing members located at the same side of the polygon as the latching hook outside the latching hook so that it can act on the hook portion so as to press it inwardly.

The sheet metal contact of the first plug connector has in cross-section a substantially polygonal shape and the latching hook is located at one of the sides of this polygon and the actuation pressing member is located at a different side of the polygon from the latching hook, wherein it can act on the hook portion with an attachment so as to press it inwardly. According to this development, the movement direction for pressing down the latching hook and the movement direction of the latching hook are separate, which may be particularly advantageous in the case of a very close arrangement of a plurality of second plug connectors beside each other in order to construct the actuation direction in an angular manner relative to the arrangement direction.

The invention also provides a first plug connector for a plug connection.

The invention further provides an advantageous latching device.

The invention further includes a simple and cost-effective method for constructing a hook portion for a latching hook on a metal sheet by providing a metal sheet, providing a tool having two tool halves, and arranging the metal sheet on the tool between the tool halves. The metal sheet is embossed with an embossing stamp. Before or during embossing, the metal sheet is further severed in portions and at the side of the cut, a raised 3D shaped surface region is embossed from the metal sheet as a hook portion which is open on at least one side with a bending or score line which deviates in portions from a straight line being formed as the connection with respect to the metal sheet which surrounds the hook portion.

In place of a tool with two tool halves, a tool with a holding-down member can also be used in order to hold the metal sheet.

BRIEF DESCRIPTION OF THE DRAWING

The invention is described in greater detail below with reference to the drawings on the basis of exemplary embodiments. They show particularly advantageous embodiments of the invention, to which the invention and the protective scope of the claims are, however, not limited. In the context of the invention and the protective scope, alternatives and equivalents of the illustrated embodiments can instead be produced. In the drawings:

FIG. 3*a* is a perspective view of the first plug connector, FIG. 3*b* is an enlarged view of a portion of FIG. 3*a*, and FIG. 3*c* is an additional enlarged view with a slightly changed perspective of FIG. 3*a;*

FIGS. 4*a*-4*c* are different views, respectively, of a hook portion on a latching arm of the first plug connector;

FIGS. 5*a*-5*f* are different views, respectively, of an additional embodiment of a first plug connector with a cable fitted thereto;

FIG. 10*a* is a sectional perspective view of an embossing tool during the first step of forming a latching hook on a first plug connector, FIG. 10*b* is a detailed view of the portion B of FIG. 10*a*, and FIG. 10*c* is a side sectional view of the tool of FIG. 10*a;*

FIGS. 11*a*-11*c* are views of the embossing tool corresponding with FIGS. 10*a*-10*c*, respectively, during a second step of forming a latching hook on a first plug connector;

FIGS. 12*a*-12*c* are view of the embossing tool corresponding with FIGS. 10*a*-10*c*, respectively, during a third step of forming a latching hook on a first plug connector;

FIG. 13*a* is a perspective view of an embossing tool, FIG. 13*b* is a detailed view of the portion D of FIG. 13*a*, and FIG. 13*c* is a side view of the tool of FIG. 13*a;*

FIGS. 16*a* and 16*b* are side views of additional first plug connectors, respectively, and FIGS. 16*c*-16*f* are perspective views, respectively, of additional second plug connectors.

DETAILED DESCRIPTION

Figure 1A:
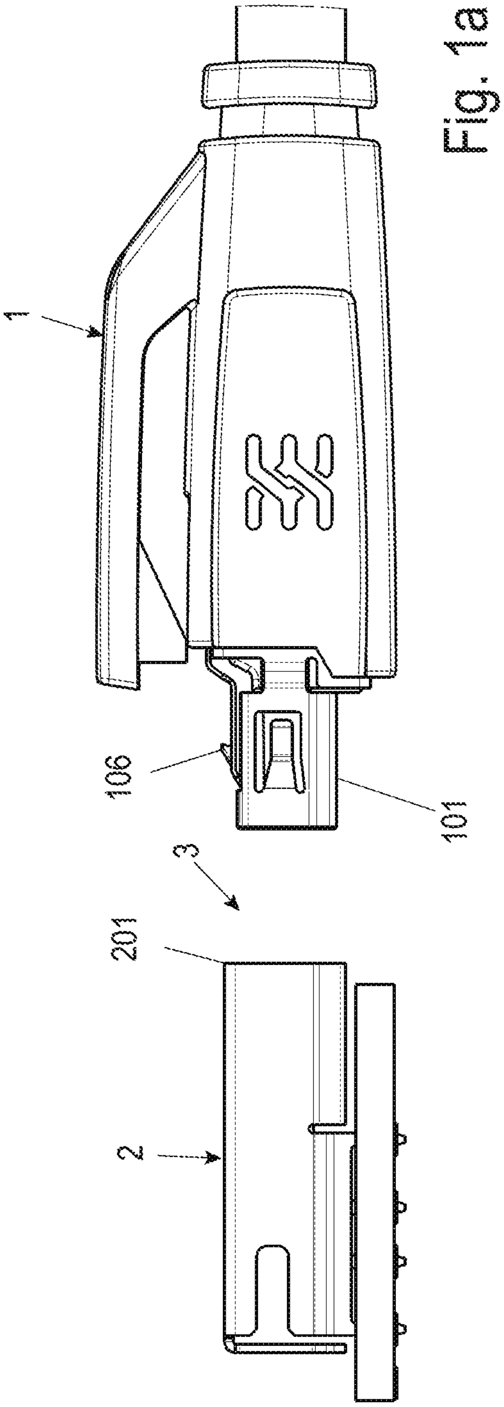
FIG. 1*a* is a side view of a plug connection having a first plug connector and a second plug connector corresponding thereto in a non-assembled state.
Figure 1B:
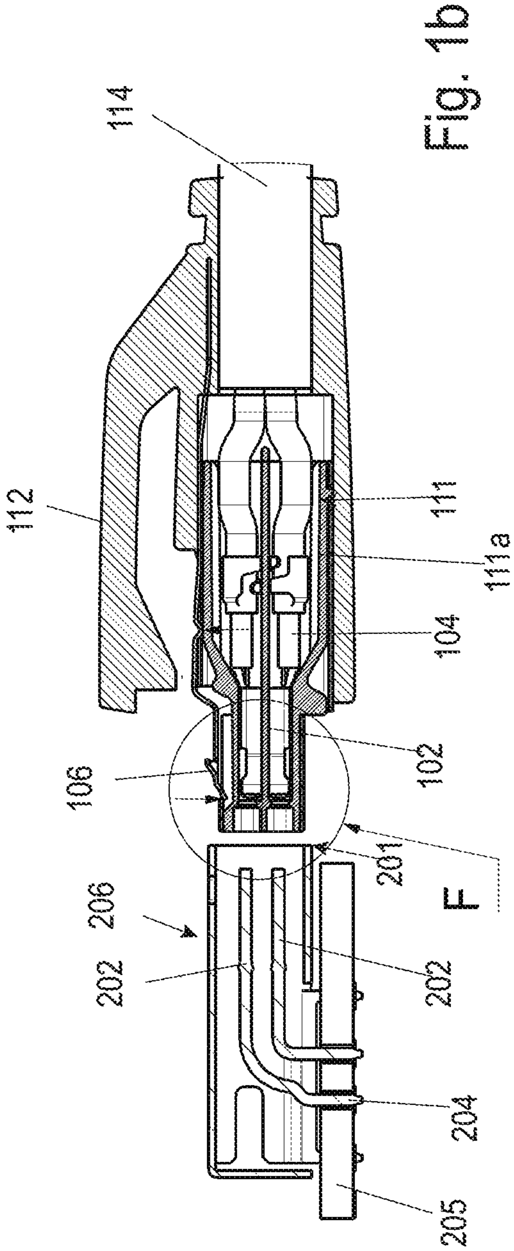
FIG. 1*b* is a sectional view of the plug connection of FIG. 1*a*.

FIG. 1 shows a first plug connector 1. FIG. 1 further shows a second plug connector 2. These two plug connectors 1, 2 can be fit together and thereby together form a plug connection (also called a plug arrangement). In this manner, for example, electrical subassemblies can be connected to each other.

Each of the plug connectors 1 and 2 has a plug face. This face includes corresponding first and second sheet metal contacts 101, 201, wherein they are consequently each produced from a metal sheet. These first and second sheet metal contacts are used in this instance to continue shielding. In particular, the corresponding sheet metal contacts may be configured in a collar-like manner. However, this is not absolutely necessary.

Corresponding first and second electrical and/or optical plug contacts 102, 202 (i.e., electrical plug contacts, optical plug contacts or both types of plug contacts) are provided, preferably on or in the sheet metal contacts 101, 201.

In this case, the first and second sheet metal contacts 101, 201 and the first and second plug contacts 101 can be fit together at a free end. To this end, the first sheet metal contact 101 and the second sheet metal contact 201 have corresponding circumferential geometries which can be fit or pushed together, for example, collar-like circumferential geometries.

Figure 1C:
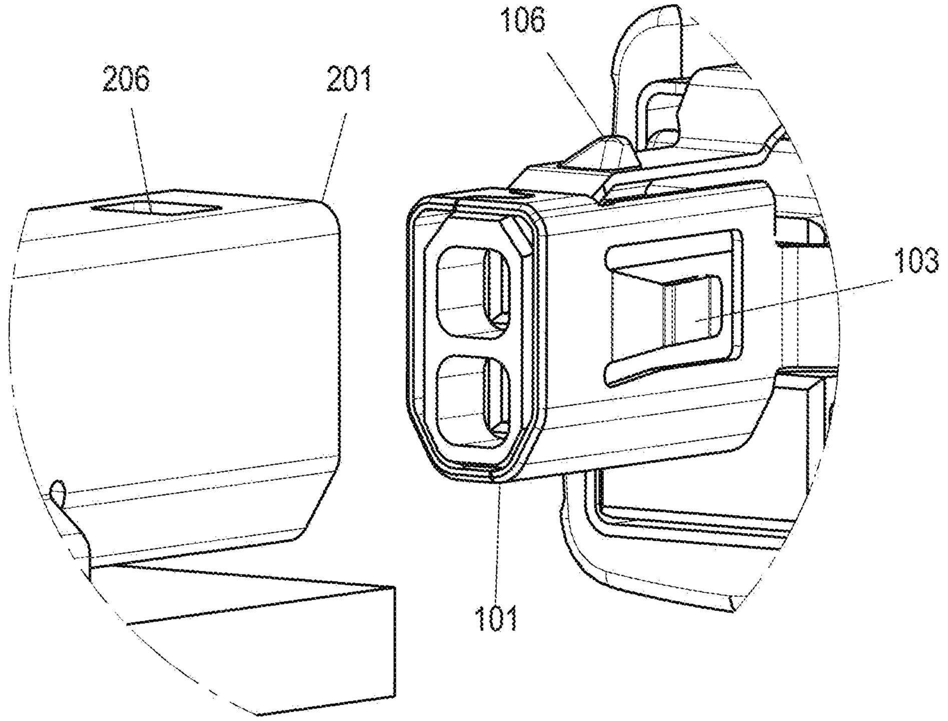
FIG. 1*c* is an exploded, perspective view of a cutout of the plug connection of FIGS. 1*a* and 1*g*, and FIGS. 1*d*, 1*e*, and 1*f* are enlarged sectional views of the region F from FIG. 1*b* before, during and after the two plug connectors have been fitted together, respectively.
Figure 1D:
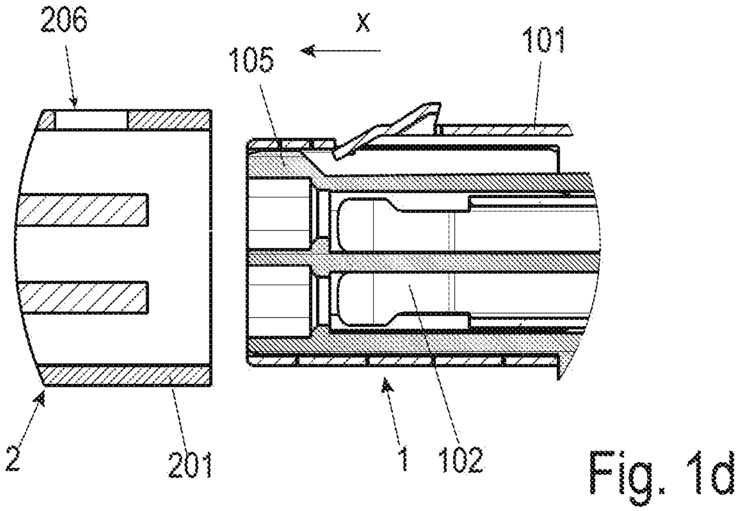
FIG. 1*g* is a perspective view of the first plug connector.
Figure 1E:
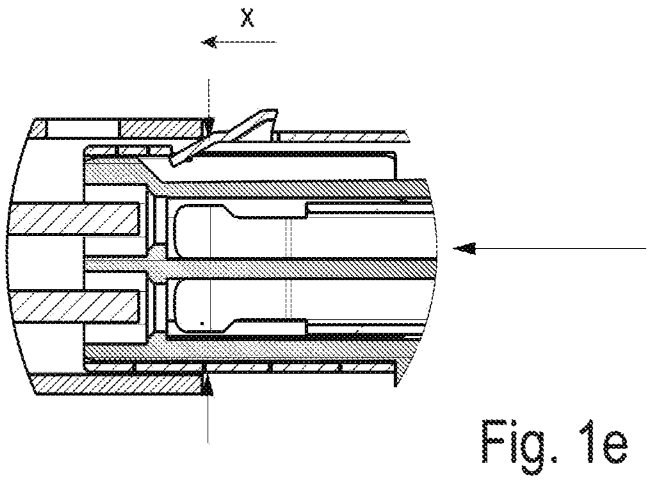
Figure 1F:
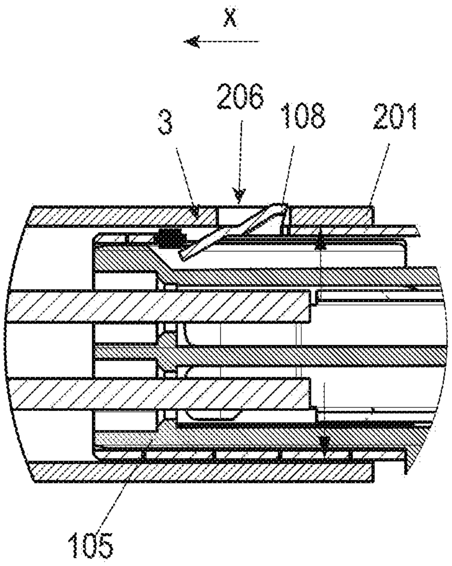
Figure 1G:
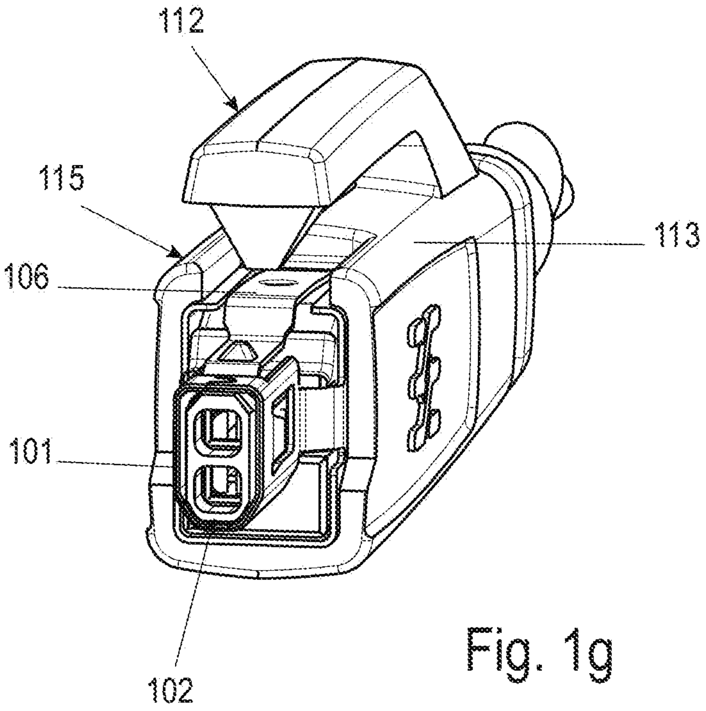

In this case, the first sheet metal contact 101 has a smaller circumference than the second sheet metal contact 201 with corresponding geometry. In this manner, the first sheet metal contact 101 can be pushed into the second sheet metal contact 201 (FIGS. 1*d*-1*f*). The first sheet metal contact 101 is then located inside the second sheet metal contact as shown in FIG. 1*f*.

The two sheet metal contacts 101 and 201 preferably include a metal sheet. To this end, they have been stamped out of a prepared metal sheet, wherein the sheet metal piece which is produced in this case is also referred to below as a sheet metal blank BZ before the bending operation. This is illustrated for the second plug connector, particularly also in FIGS. 14 and 15, wherein FIG. 15 shows a single sheet metal blank for two of the second plug connectors.

These sheet metal blanks BZ have been—where applicable, after additional method steps described below—bent into a sheet metal contact shape, in this instance into a type of collar shape. The contacts are connected to each other in the region of a type of lock geometry 110 (as shown for example in FIG. 3*b* and FIGS. 14 and 15) so that there is produced a sheet metal contact 101, 201 which is preferably circumferentially closed in portions and which is in this instance collar-like, respectively.

When viewed from above and in the region of the plug face, the respective sheet metal contacts 101, 201 can form, for example, a round shape or a polygonal shape, particularly substantially a rectangular shape (for example, with chamfered corner regions). The collar can be constructed so as to be circumferentially closed, but this is not necessary.

The two sheet metal contacts 101, 201 which are pushed one in the other can contact each other, wherein an electrical contact between the two sheet metal contacts 101, 201 can be supported in the manner of contact arms 103 via resilient contacts. These contact arms 103 can be formed in that a type of arm is stamped out of the metal, which arm is still connected, however, at one side to the respective sheet metal contact and is then bent slightly obliquely relative to the sheet metal contact—for example, relative to the first sheet metal contact 101—in the direction of the other plug connector 1 and contacts the second sheet metal contact 201 of the other plug connector 2 as shown in FIGS. 1*c*, 3*b* and 3*c*.

In this manner, a potential can be distributed over the plug connection. For example, a shield potential can be distributed and/or a shielding for the plug contacts 102, 202 inside the sheet metal contacts 101, 201 can be produced.

The respective sheet metal contacts 101, 201 preferably have substantially constant geometric dimensions in the region of the portions which can be fit together. The respective portion can also be joined by a region of greater dimensions adjacent to a type of graduation 101*a* so as to receive a plug housing 111*a* and where applicable a cable manager 111 which is inserted therein and which is made of plastics material or the like. A cable 114 with conductors can be fastened to the first plug connector 1 at the end thereof facing away from the plug face.

Figure 14A:
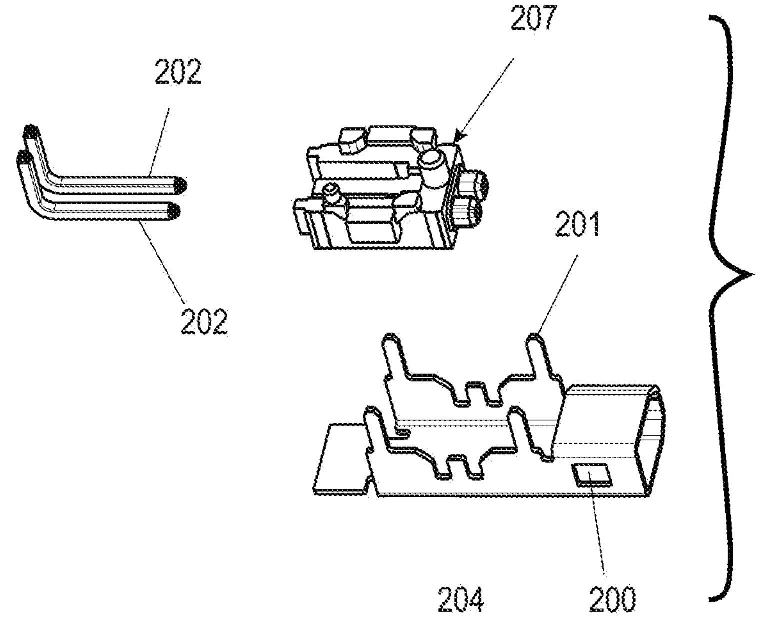
FIG. 14*a* is an exploded view of the elements of a second plug connector.
Figure 14B:
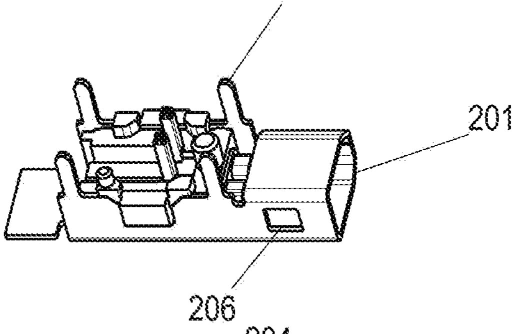
FIG. 14*b* is a perspective view of the elements of FIG. 14*a* in an assembled state.
Figure 14C:
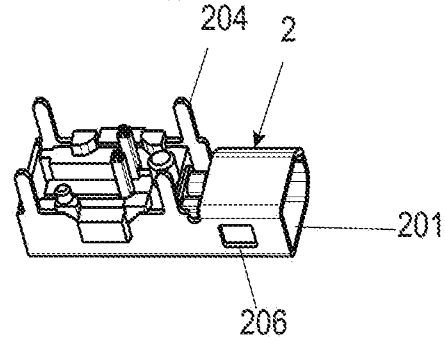
FIG. 14*c* is a perspective view of the assembly of FIG. 14*b* wherein a sheet metal flap has been folded over.
Figure 15A:
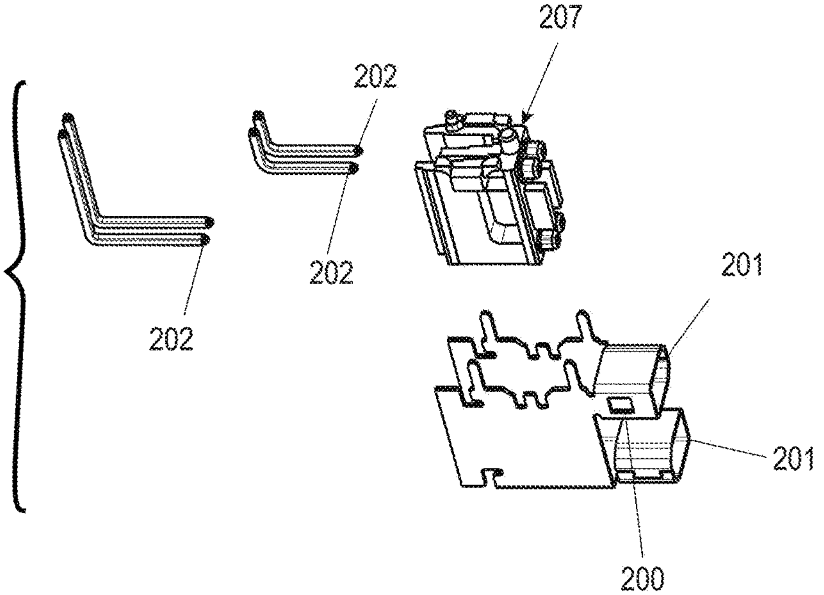
FIG. 15*a* is an exploded view of the elements of an additional second plug connector which is in the form of a type of double plug connector.
Figure 15B:
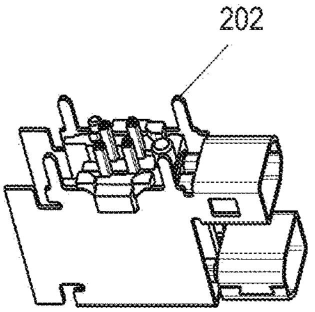
FIG. 15*b* is a perspective view of the elements of FIG. 15*a* in an assembled state.
Figure 15C:
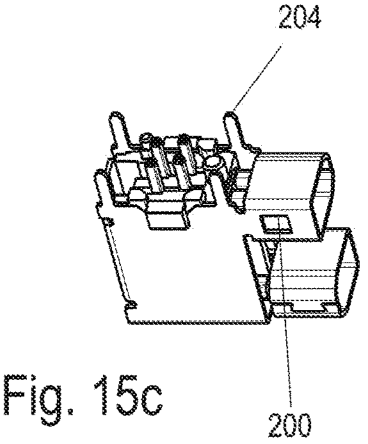
FIG. 15*c* is a perspective view of the assembly of FIG. 15*b* wherein a sheet metal flap has been folded over.
Figure 15D:
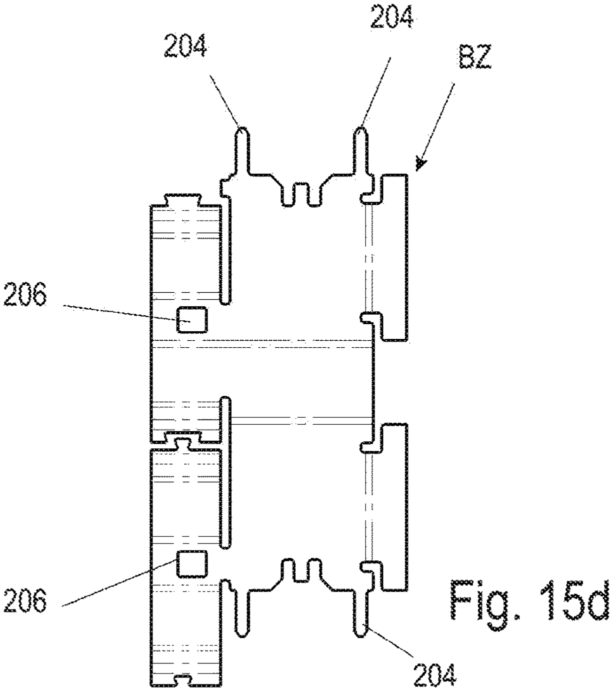
FIG. 15*d* is a plan view of a blank for forming the collar-like shielding contact.

The second plug connector 2 can also be configured for connection to a cable. However, it may also be in the form of a printed circuit board plug connector, the connection contacts 202 of which are connected at the other ends thereof to a printed circuit board 205. Furthermore, the sheet metal contacts 201 can be connected in a conductive manner to the printed circuit board 205, for example, via solder connections 204 (FIG. 14*a*, FIG. 15*a*).

In this case, it is also possible to construct on the printed circuit board 205 a plurality of the second plug connectors 2 or several of the second plug connectors 201 can share a printed circuit board 205.

Figure 14D:
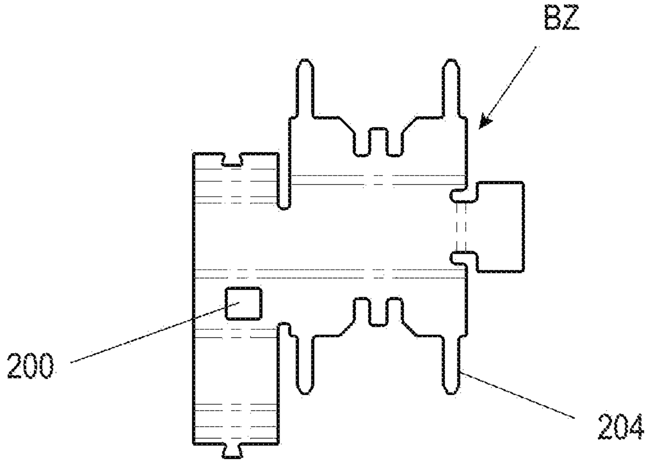
FIG. 14*d* is a plan view of a blank for forming a collar-like shielding contact.

Two of the sheet metal contacts 201 of the second plug connectors 2 can be connected to each other in a conductive manner. They can also be produced integrally from a common or single sheet metal blank BZ as shown in FIG. 14*d* and FIG. 15 which then has portions for forming the two sheet metal contacts 202 in particular in a collar-like form.

In the folded or bent state, the sheet metal blanks BZ can also form a type of plug housing which can be fixed to the printed circuit board 205 via the solder connections 204, wherein the plug housing can receive a contact carrier 207 which in turn has plug contacts 202. In this case, the contact carrier 207 can be constructed integrally for two of the plug connectors 201, wherein it can then have twice the number of plug contacts 201 (for the two plug connectors) so that two of the second plug connectors share a single contact carrier as shown in FIG. 15. Consequently, a type of partially integrated double connection, which can also generally be referred to as the second plug connector and which has two plug faces, is provided. In this case, the latching recesses 206 of the two sheet metal contacts 201 can be constructed on the single sheet metal blank so as to be angularly offset in a circumferential direction, for example, rotated through 180° relative to each other so that the actuation pressing member 112 of two corresponding first plug connectors 1 are also similarly angularly offset in the case of positioning of the corresponding first plug connectors 1 in a manner angularly offset through 180° so that they do not negatively influence each other during actuation.

The plug contacts 102, 202 of the first and second plug connectors can each be in the form of either pin contacts or bush contacts. In this instance, the plug contacts 101 of the first plug connector 1 are in the form of bush contacts and in this case also at the other end thereof in the form of crimp contacts in addition, and the plug contacts 102 of the second plug connector are in the form of pin contacts. The arrangement may also be transposed.

The plug contacts 102, 202 can be fit together inside the assembled sheet metal contacts 101, 201 or are fit together in the assembled state of the sheet metal contacts 101, 201. Their other ends can be connected directly or via conductor pieces to a connection device, therefore to connection contacts 104, 204 in order to contact a printed circuit board 205 (the plug contacts 202 are pin contacts in this case) or to contact the conductors of a cable 114.

The plug contacts 102 of the first plug connector 1 can be arranged in a contact holder 105. The contact holder 105 may include a non-conductive material, in particular a non-conductive plastics material. It can also be constructed integrally with the cable manager 111 and may then have regions of different extents, between which, for example, a type of graduation 105*a* can be constructed. It retains the plug contacts 102 of the first plug connector in the sheet metal contact 101 in a defined position and with spacing from each other.

The plug housing 111*a* can be constructed inside the sheet metal contact 101, wherein it is intended to be configured so that the assembly of the first and second plug connectors 1, 2 is not impeded.

The corresponding sheet metal contacts 101, 201 and the corresponding plug contacts 102, 202 and in this case also the contact holder 105 form corresponding plug faces at the sides thereof which face each other and which can be fit together. The respective plug face can have relatively small dimensions of only a few millimeters.

The first and second plug connectors 1, 2 can thereby be fit together.

So that the first and second plug connectors 1, 2 cannot be released again unintentionally from the assembled state, at least one latching connection 3 is constructed between the first and second plug connectors 1, 2. This latching connection 3 includes a first latching device 106 at the first plug connector 1 and a corresponding second latching device 206 on the second plug connector 2 (see, for example, FIGS. 1*b* and 1*c*). In this case, the first latching device may be in the form of a latching hook 106 and the second latching device may be in the form of a corresponding latching recess 206 which forms a latching edge at one side, in which the latching hook portion 108 latches when the two plug connectors 1, 2 are fit together. A transposed configuration in the sense of a kinematic reversal is also conceivable, but not illustrated. The latching recess 206 for receiving the latching hook portion 108 can also be formed by a graduation. The important aspect is that it has a latching edge.

The latching recess 206 is in the form of a latching hole in this case. It can simply be formed in the manner of a through-opening separated from the metal sheet, from which the second sheet metal contact 201 is produced.

However, the first latching device is in the form of a latching hook 106 which can resiliently engage in this latching recess 106.

The latching hook has a leaf-spring-like latching arm 107 and a hook portion 108.

For example, in the case of high-poled individual plug connectors with two or more rows of plug contacts 102, 202, there may also be provision for constructing one, two or more hook portions 108 on a latching arm 107 and two or more corresponding latching recesses 206 on at least one sheet metal contact 201 in order to increase the withdrawal force.

This is illustrated, for example, in FIG. 16, wherein the latching hook 103 illustrated in FIG. 16*b* has on a common overarching latching arm 107 two of the hook portions 108 which can engage in a relatively large or a plurality of relatively small latching recesses 106. In this manner, substantially more latching hooks 106 could also further be arranged on a latching arm. However, FIG. 16*b* shows a latching arm 107 with only one hook portion 106.

The latching arm 107 has been stamped out of the sheet metal blank in order to produce the sheet metal contact 101. At a free end facing the plug face, it has the hook portion 108. At the other end thereof, it is connected to the blank. This connection can be located in the region of the sheet metal contact 101 with a greater diameter. The latching arm 107 can then also have a type of graduation 107*a*.

The latching arm 107 itself can be formed from the blank by introducing a cut/stamped portion in the manner of a "U".

The hook portion 108 can be formed—for example, in the initially produced latching arm 107—by a combined stamping and embossing operation. This is explained in greater detail below.

It is advantageous for the hook portion 108 to have a non-linear connection line in the manner of a non-linear bending or score line 108*c* relative to the surrounding metal sheet, in this case of the latching arm 107. Instead, for example, it may have a semi-circular or u-shaped or v-shaped bending line 108*c* and connection line relative to the surrounding metal sheet. Only the connection line which would supplement the non-linear bending line to form a circumferentially closed geometry is in the form of a cut 108*d* or was severed, wherein the region inside the non-linear connection line was formed in an embossing manner to form a raised 3D shaped surface region or in the form of a region 108*a* which can be referred to as being dome-like and which forms the actual hook portion 108. The hook portion 108 is therefore very stable per se. As a result of the cut 108*d* which was formed in the metal sheet during the construction thereof, it preferably has an open side 108*b* (see FIGS. 4*a* to 4*c*) which is configured to ensure a secure retention in the latching recess 206, particularly by the edges of the raised 3D shaped surface region 108*a* whose edges define an open side with the cut 108*d*, forming a type of oblique undercut side which can be reliably latched in the latching recess 206 in a self-locking manner.

In the region of the latching hook 108, only one single short, straight incision 108*d* has been formed in the latching arm 107 (FIG. 4). Subsequently, the projecting raised 3D shaped surface region 108*a* was pressed at one side of this incision as a hook portion 108 in a forming manner from the region of the latching arm 107 or another metal sheet.

According to a preferred construction type but not necessarily intended to be implemented precisely in this manner, the hook portion 108 may have three bending lines 108*c* which are orientated at right-angles to each other (FIGS. 4*a*-4*c*) in the direction towards the latching arm 107. In this case, the material inside this u-shaped bending line arrangement (see FIGS. 4*a*-4*c* and optionally FIGS. 10 to 12) has been pushed forwards in an embossing manner towards one side so that a type of dome-like region which is open towards one side is stamped out of the hook portion, in particular a type of pyramid which is open at one side and which projects from the hook portion and which is locked in a securing manner when the two plug connectors are pushed together.

The open side 108*b* of the hook portion 108, which is preferably dome-like and open at one side and which is preferably even pyramid-like and open at one side, forms a type of relatively sharp latching edge which is latched securely in the latching recess 206, wherein the hook portion 108 has, as a result of the further pyramid-like geometry and the closed walls or sides which are thereby preferably orientated at an angle less than 90° relative to each other, has relatively good static properties per se which are well-protected against bending by the application of pulling forces to the latching connection. Furthermore, a type of inclined introduction member is formed on the hook-like portion 108.

The open side 108*b* can also be constructed at an angle not equal to 90° relative to the actual surrounding wall material of the latching arm 107 and can in this manner form a type of undercut which can be latched particularly securely in the latching recess 206. In this manner, a self-locking latching connection 3 can be constructed. The open side is orientated counter to the push-in direction X in relation to the first plug connector 1 if it is pushed into the second stationary plug connector 2 for example.

In order to latch, the two plug connectors 1, 2 are pushed together. In this case, the closed sides of the hook portion 108 of the latching hook 106 are located in the pushing or insertion direction. The side, located in the introduction direction X (FIGS. 1*d* to 1*f*), of the hook portion 108 which is in the form of a partial pyramid in this case acts as an inclined introduction member.

The resilient arm 107 is thereby redirected towards the sheet metal contact interior when the hook portion 108 strikes the sheet metal contact 201 and the latching arm 107 and the hook portion 108 give way inwardly until the hook portion 108 can move resiliently outwards again in the region of the latching recess 206 of the second plug connector, wherein the hook portion 108 pivots outwards into the latching recess 206 until or so that the first and second plug connectors are latched with each other. It is possible to latch this latching connection. It is well-secured against relatively high withdrawal forces in a simple manner. It further takes up only a small amount of structural space.

A simple method for producing the hook portion 108 in a metal sheet—in particular in the latching arm—is explained in greater detail below with reference to FIGS. 10 to 12.

In order to configure the latching connection 3 in an even more optimum manner and in order to increase the latching force, the latching arm 107 is arranged in a pretensioned manner on the first plug connector by an abutment support.

This abutment arrangement may be configured in different manners.

According to one embodiment shown in FIGS. 1, 2 and 3, the latching arm 107 is bent in a region between its ends, preferably in a substantially central region and in the insertion direction X before the graduation thereof via an abutment region 109 of the contact carrier and is supported internally thereon so that the resilient arm 107 is pretensioned. The latching arm 107 can have an embossing for defined support in the abutment region 109 (FIG. 1*d*).

Figure 2D:
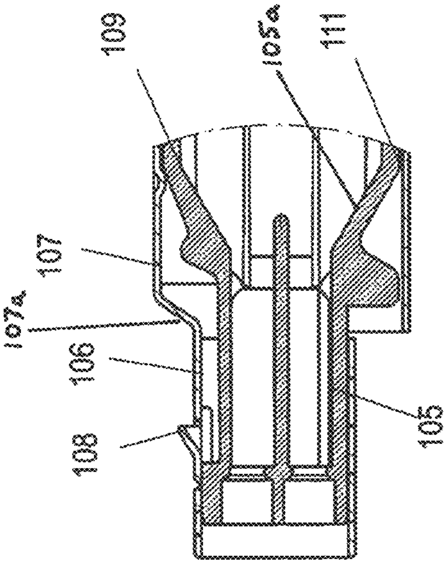
FIGS. 2*c* and 2*d* are a partially sectioned view and a sectioned view, respectively, of regions of the first plug connector.
Figure 2B:
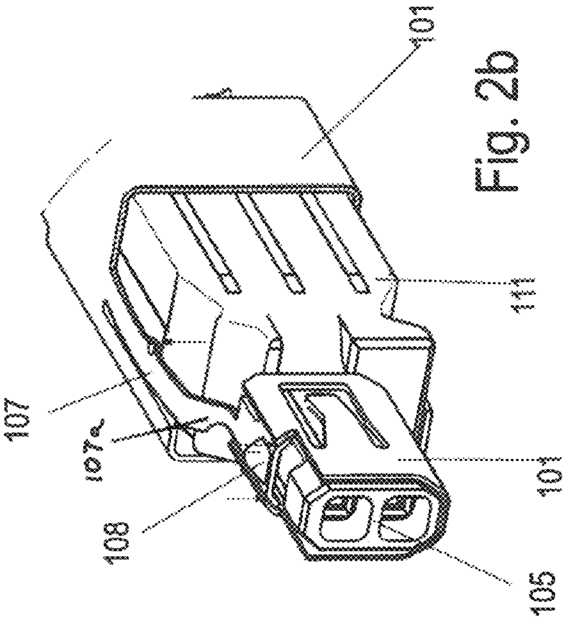
FIG. 2*b* is a perspective view similar to FIG. 2*a* with partially hidden regions of a sheet metal contact.
Figure 2C:
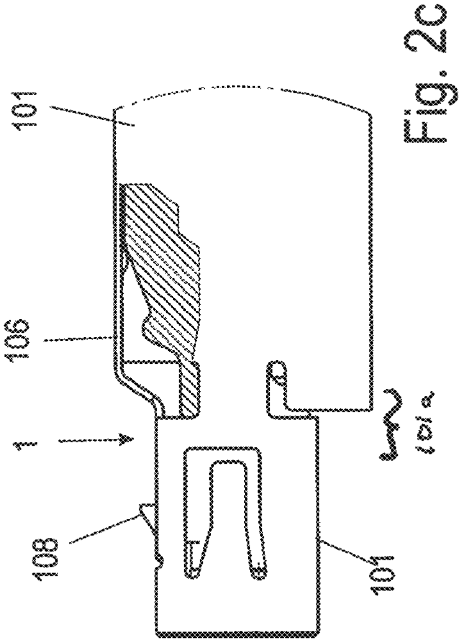
Figure 2A:
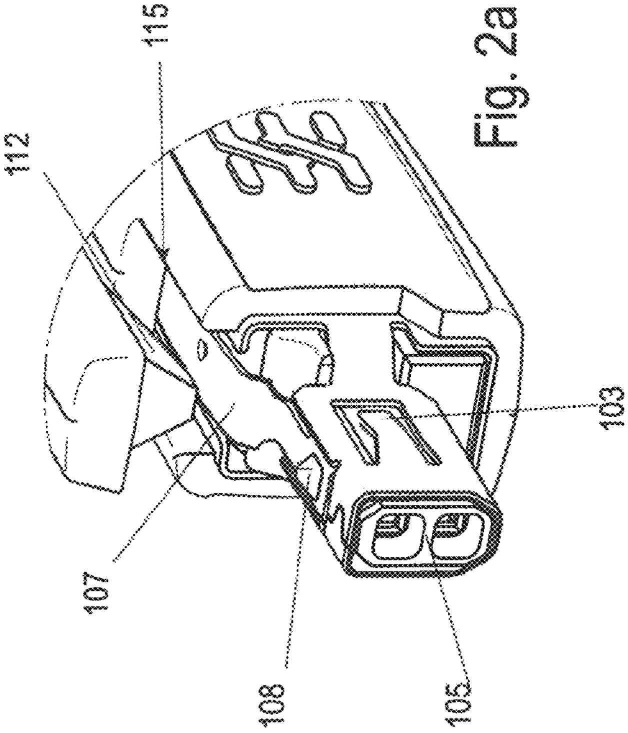
FIG. 2*a* is a perspective view of a front region of the one plug connector from FIG. 1 with a plug face and a region of the plug connector in abutment with the plug face.

The free end of the latching arm 107 is supported internally on an edge region on the sheet metal contact 101 of the first plug connector 1, which edge region it is constructed in an overlapping manner in portions as shown in FIGS. 2*a* and 2*b*.

The leaf-spring-like latching arm 107 is consequently connected at a first end, facing away from the plug face, of the first plug connector to the material of the metal sheet from which it has been stamped, then bent via the abutment region of the internal plastics element such as carriers 105, 111 and resiliently supported at the free end thereof internally on a region of the sheet metal contact 101 which it overlaps internally at one or two edges. The sheet metal contact is not circumferentially closed in this case but instead has a gap under which the latching arm 107 is located and from which the hook portion 108 projects outwards. In this manner, the latching hook is arranged in a pretensioned manner on the first plug connector as shown in FIGS. 2*a*-2*d*.

In order to release the latching connection 3, an actuation device can be constructed on the first plug connector.

This actuation device may be in the form of an actuation pressing member 112. The actuation pressing member 112 may be in the form of a movable element on a gripping region 113 of the first plug connector 1. The gripping region 113 can in turn be constructed on the first plug connector 1 in a region adjoining the plug face of the first plug connector 1. The gripping region 113 may include plastics material. The actuation pressing member 112 can be constructed integrally with the gripping region 113. The gripping region 113 may be injection-moulded with a plastics injection-moulding method around an internal plug housing 111*a*.

The actuation pressing member 112 may be in the form of a type of resilient arm or rocker bar which is connected to the gripping region 113 at one end 112*a* thereof or with spacing therefrom in the region of a connection 112*b* and which has at the other end thereof a pressing region 112*c* which is located above the latching hook 106. If the actuation pressing member 112 is pressed down, the latching hook 106 is pressed inwards so that the hook portion 108 is released from the latching recess 206 so that the two plug connectors 1, 2 can be pulled apart again.

In this case, the actuation pressing member 112 can, in a substantially polygonal and preferably rectangular configuration of the sheet metal contact 101, be constructed at the same side of the sheet metal contact 101 of the first plug connector as the latching hook 106. It is then preferably located substantially parallel with the latching hook 106 with spacing from this latching hook 106.

Such embodiments are shown, for example, in FIGS. 1, 2 and 5.

Figure 7:
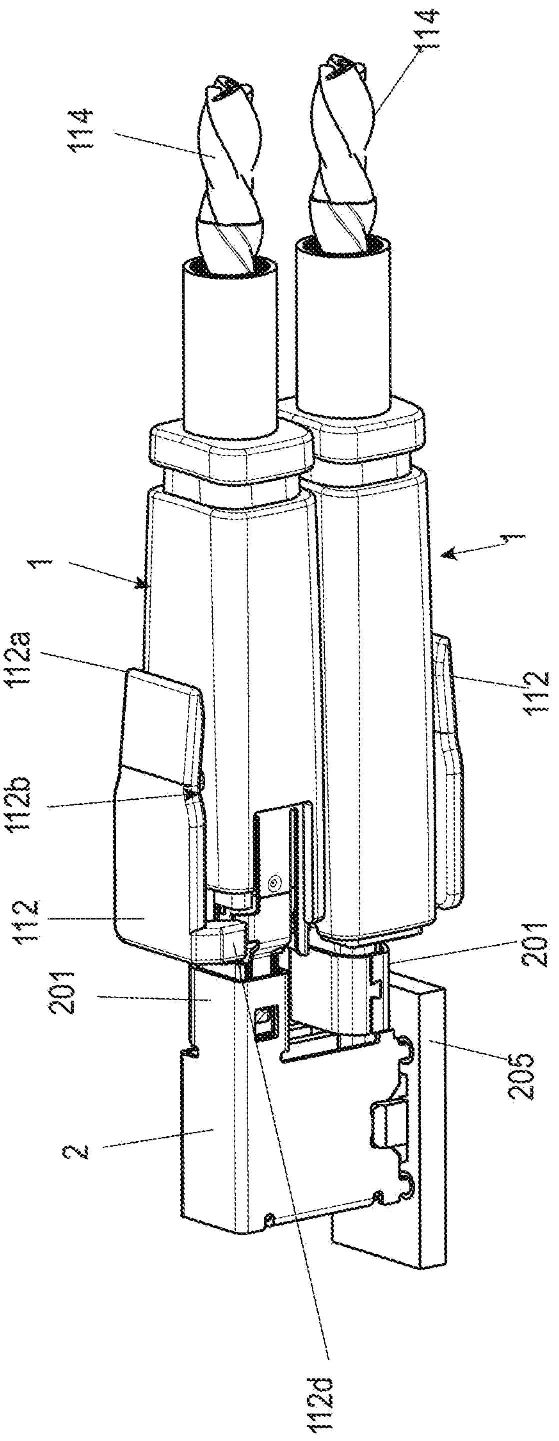
FIG. 7 is a top perspective view of yet another plug connection with two first and two second plug connectors, wherein the last connectors are mounted on a common printed circuit board.
Figure 6:
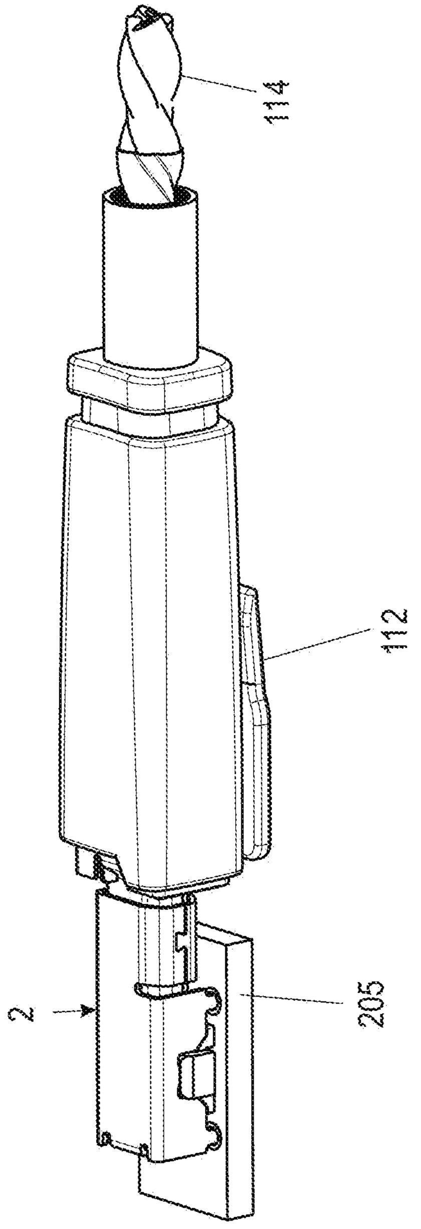
FIG. 6 is a top perspective view of an additional plug connection with a first and second plug connector.
Figures 8A, 8B, 8C, 8D, 8E, 8F:
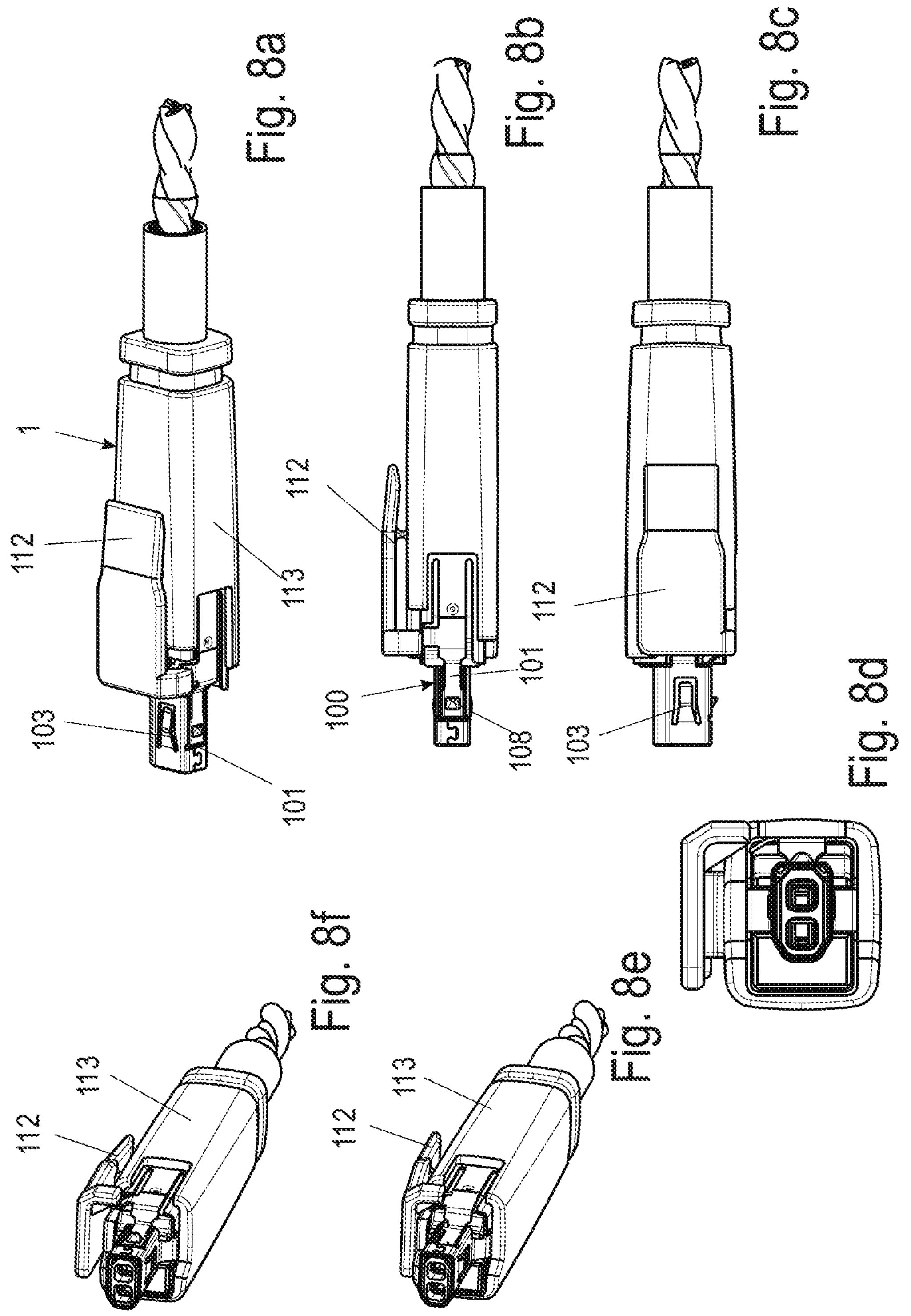
FIGS. 8*a*-8*f* are different views, respectively of a further embodiment of a first plug connector.
Figure 9A:
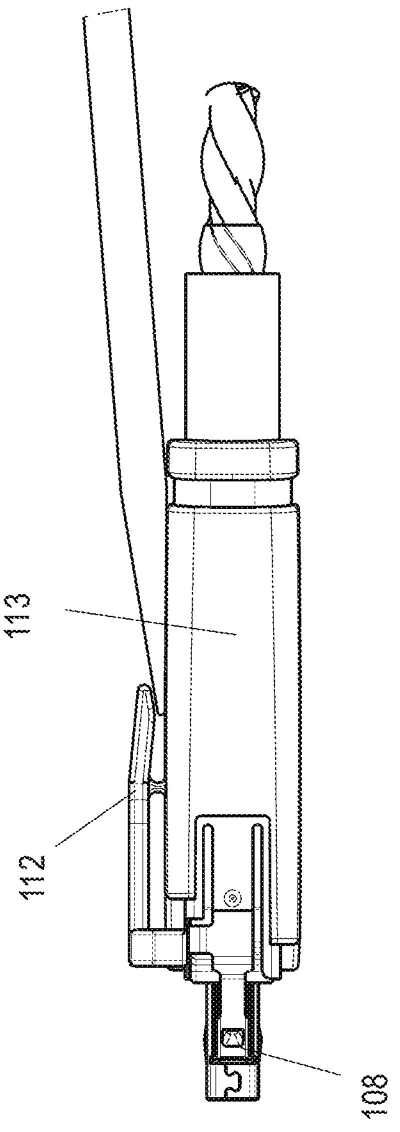
FIGS. 9*a* and 9*b* are front and sectional views, respectively, of the first plug connector from FIG. 8 at the beginning of actuation with a screwdriver
Figure 9C:
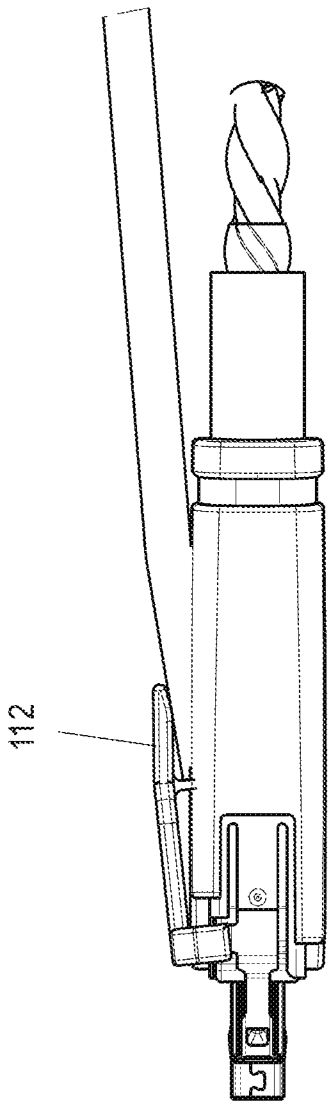
FIGS. 9*c* and 9*d* are views corresponding with FIGS. 9*a* and 9*b*, respectively, in a later state of actuation with a screwdriver.
Figure 9B:
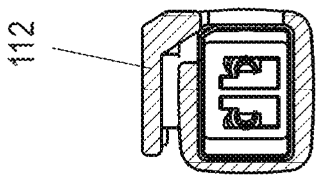
Figure 9D:
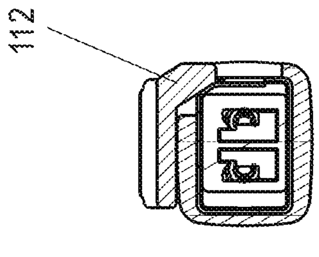

However, the actuation pressing member 112 may also not be constructed at the same side but instead at a different side of the sheet metal contact 101 outside the sheet metal contact 101 with respect to the latching hook 106, for example, at a side which is located or orientated in a state rotated through 90° relative thereto. It is then located substantially parallel with this other side. The actuation pressing member 112 may then have, for example, at the end thereof provided for actuation an attachment 112*d* (FIG. 7) as a pressing region which acts obliquely on the latching hook 106 during the pressing-down action in order again to press it inwardly on the latching arm 107 in order to release the hook portion 106 from the latching arrangement thereof.

In this case, a recess may be provided in the gripping region 113 under the actuation pressing member so that the actuation pressing member can act directly on the latching arm 106 or the latching hook 108 during the pressing-down action.

Such embodiments are shown, for example, in FIGS. 6, 7, 8 and 9.

This last embodiment may advantageously be used when a plurality of second plug connectors 2 are constructed in tight rows on a device or on the printed circuit board 205 or the like and when the plug connections are thereby arranged so tightly that between them there would be no space for movable actuation pressing members 112. Then, the actuation pressing member 112 is preferably constructed for a 90°-actuation of the latching hook 106. Thus, the actuation direction of the actuation pressing member 112 and the actuation direction for releasing the latching hook 106 are orientated obliquely to each other or orientated perpendicularly to each other.

FIGS. 10 to 12 show how in a tool 4 with two halves 410, 402 in which a sheet metal blank (for example the latching arm 107) is placed, the hook portion 108 of the latching hook 106 can be constructed on a latching arm 107 with a single embossing stamp 403 (FIG. 13). The embossing stamp is a type of sliding member which has a pyramid-like tip which is relatively sharp at one side. The lower tool 401 in this case has a sliding guide 404 for the embossing stamp 403. The upper tool 402 in this case has a recess 405 for the hook portion 108 which is intended to be formed. A counter-contour may be provided instead of or on the recess.

The sheet metal blank is placed between the tool halves 401 and the tool is closed as shown in FIG. 10. Subsequently, the embossing stamp 403 is pressed into the sheet metal blank from the side. Referring to FIG. 11, the raised 3D shaped surface region 108*a* is formed with the bending line 108*c*, wherein the cut 108*d* is also produced or formed with the same embossing stamp 403 and the raised 3D shaped surface region 108*a* is produced with the generally non-linear but instead u-shaped bending line 108*c* and the open side 108*d*. This method is simple, reliable and cost-effective. The latching arm can be cut or have been cut before the hook portion is formed from the prepared metal sheet as shown or afterwards.

The invention claimed is:

1. An electrical and/or optical plug connection, comprising a. a first plug connector and a second plug connector which corresponds with and configured to fit said first plug connector, said first and second plug connectors each having a plug face having a sheet metal contact configured to be fit together in an electrically contacting manner and at least one of an electrical and an optical plug contacts configured to be fit together and which are arranged in spaced relation from said sheet metal contact;

b. a latching connection for connecting said first and second plug connectors in an assembled state, said latching connection including a latching hook on said first plug connector and a latching recess having a latching edge on said second plug connector, said latching hook engaging said latching recess when said first and second plug connectors are fit together, said latching hook having a latching arm and a hook portion, said hook portion being connected with a surrounding metal sheet of said latching arm via a bending line which deviates from a straight line, said hook portion being configured as a raised three-dimensional shaped surface region having at least one open side; and c. an actuation device on said first plug connector for releasing said latching connection.

2. The plug connection as defined in claim 1, wherein said raised three-dimensional shaped surface region of said hook portion forms a portion of a pyramid.

3. The plug connection as defined in claim 1, wherein said sheet metal contact of said first plug connector and said sheet metal contact of said second plug connector are configured to be fit together in a collar-like manner and wherein said plug contacts are arranged inside said collar-like sheet metal contacts.

4. The plug connection as defined in claim 1, wherein said hook portion open side is arranged at an angle not equal to 90° relative to a surrounding surface of said latching arm, said open side having edges latched in a self-locking manner behind said latching edge of said latching recess.

5. The plug connection as defined in claim 1, wherein said bending line is one of u-shaped, v-shaped, and semi-circular.

6. The plug connection as defined in claim 1, wherein said latching arm is supported between the ends thereof so as to be pretensioned as an abutment on another element of said first plug connector.

7. The plug connection as defined in claim 1, wherein said plug contacts of said first plug connector are arranged in a contact carrier and wherein said latching arm is supported in a pretensioned manner on said contact carrier between the ends thereof in an abutment-like manner.

8. The plug connection as defined in claim 6, wherein a free end of said pretensioned latching arm is supported internally on an edge region of said sheet metal contact of said first plug connector, an edge region of said latching arm overlapping portions of said sheet metal contact.

9. The plug connection as defined in claim 7, wherein said latching arm has a graduation and said contact carrier and said sheet metal contact also have a graduation.

10. The plug connection as defined in claim 1, wherein said actuation device is configured as a lever-like actuation pressing member which presses said latching hook to move said hook portion out of said latching recess into a region inside a circumference of the sheet metal contact of said second plug connector, whereby said latching connection can be released and said plug connectors can be pulled apart.

11. The plug connection as defined in claim 10, wherein said sheet metal contact of said first plug connector has in cross-section a polygonal shape and wherein said latching hook is located at one side of said polygonal sheet metal contact and said actuation pressing member is located at the same side of said polygonal sheet metal contact to engage said hook portion to press it inwardly.

12. The plug connection as defined in claim 10, wherein said sheet metal contact of said first plug connector has in cross-section a polygonal shape and wherein said latching hook is located at one side of said polygonal sheet metal contact and said actuation pressing member is located at a different side of said polygonal sheet metal contact to engage said hook portion to press it inwardly.

* * * * *